INVENTORS
PER WOLFF
SVEND HENNING KAABER

United States Patent Office 3,440,219
Patented Apr. 22, 1969

3,440,219
POLYMERISATION PROCESS
Per Wolff and Svend Henning Kaaber, Farum, Denmark, assignors to Johns-Manville Corporation, New York, N.Y., a corporation of New York
Filed Feb. 5, 1965, Ser. No. 430,703
Claims priority, application Denmark, Feb. 7, 1964, 600/64
Int. Cl. C08f 1/08
U.S. Cl. 260—63                                                     10 Claims

ABSTRACT OF THE DISCLOSURE

In liquid heterogenous phase polymerization in a closed vessel, the progress of polymerization is controlled by adding, at the latest during the polymerization, a volatile substance practically insoluble in the continuous phase of the reaction mixture, but easily soluble in the dispersed monomer, and only slightly soluble in the resulting polymer using the partial pressure of said volatile substance for governing the polymerization.

---

Figure 1:
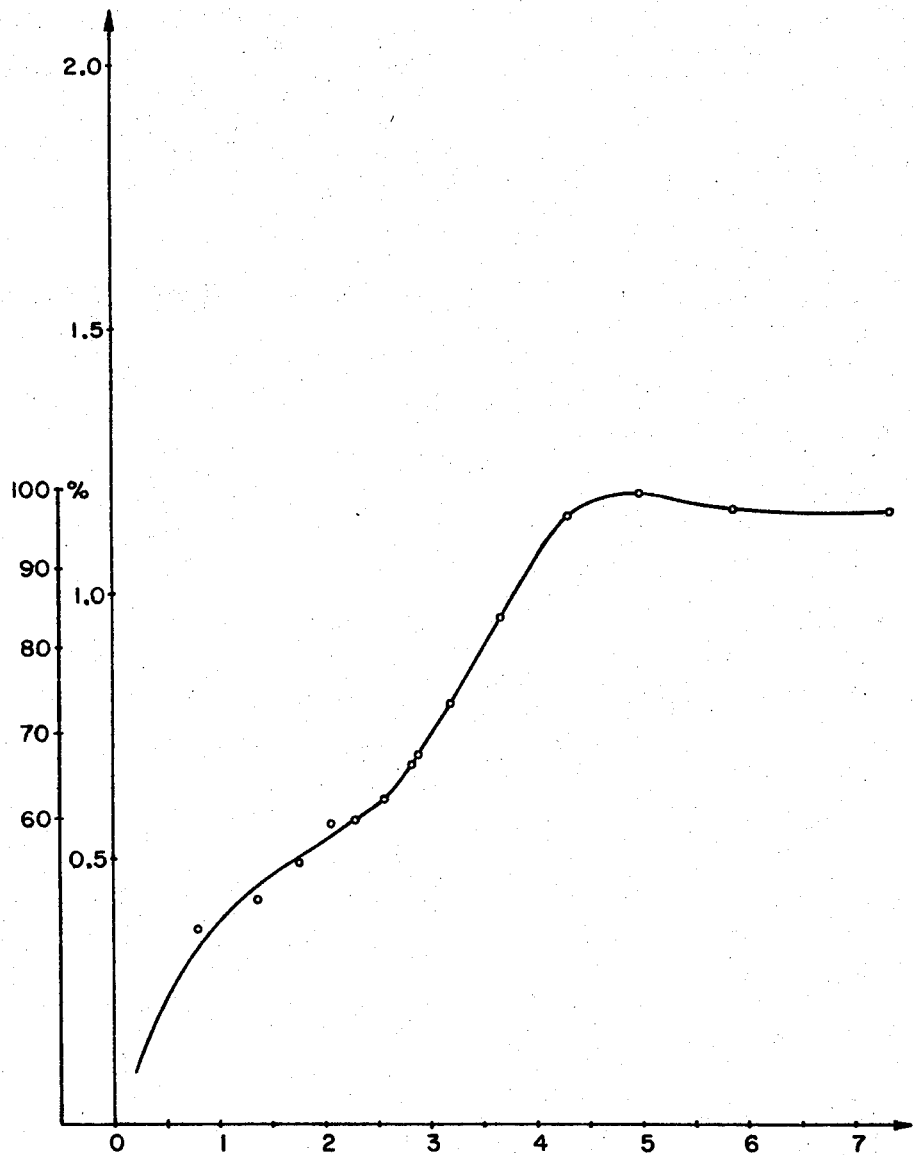

This invention relates to a method of controlling a polymerisation process in a closed container, in which the course of a polymerisation in suspension or emulsion can be checked and, if desired, regulated during its progress.

Polymerisation in heterogeneous phase is one of the most important technical processes for production of polymers. It is carried out by finely dispersing the monomer in a medium in which it is insoluble or only slightly soluble, and making it polymerise in the dispersed state. The monomer is dispersed in a liquid medium, which in practically all cases is water, other liquids like e.g. petrol, liquid paraffin, alcohols, and formamide being only exceptionally considered, e.g. in the case of water-sensitive monomers.

Three fundamentally different polymerisation methods exist, viz. emulsion polymerisation, suspension polymerisation ("bead polymerisation") and precipitation polymerisation.

By a suspension polymerisation, the monomer is finely dispersed in the continuous phase by intensive stirring. The dispersing may be supported by means of protective colloids like e.g. polyvinyl alcohol or highly comminuted solid substances either of the betonite type, or in the form of insoluble phosphates. The polymerisation process is initiated by the polymerisation catalyst, which is dissolved in the monomer, and is insoluble in the continuous phase. The properties of the polymer, which is produced by suspension polymerisation, are identical to those of polymers obtained by a homogeneous polymerisation.

In cases of emulsion polymerisation, proper emulsifying agents of the sodium oleate type are employed. Water-soluble catalysts, e.g. potassium persulphate are used. The polymerisation product is obtained in finely dispersed form as a latex with a particle size of about $0.1/\mu$. The special reaction mechanism of the emulsion polymerisation permits a high polymerisation rate, combined with a high molecular weight of the resulting product.

In practice, polymerisation methods are also used which must be regarded as transitional stages between the two methods mentioned above, e.g. dispersion polymerisation of vinyl acetate using polyvinyl alcohol as a protective colloid, but in connection with a water-soluble polymerisation catalyst.

Many monomers, primarily acrylonitrile, cannot be polymerised to form a latex, because the polymer precipitates as soon as it is formed. A precipitation polymerisation of this kind takes place, if the polymer is insoluble in the monomer, and may be of substantial technical importance if the polymer can be precipitated in a fine-grained state without clotting, which is the case with e.g. acrylonitrile and vinyl chloride.

The said methods are of great technical importance and in the course of time many improved embodiments have come into being, aiming at improving the properties of the resulting products.

However, there are still several unsolved problems in connection with the accomplishment of the polymerisation, and one of these, viz. a quick and safe control with the degree of conversion at any given moment, forms an object of the present invention.

It is a well known fact that it is extremely important to be able to follow the rate or velocity of the conversion during a polymerisation, especially if the latter is on an industrial scale. This is of consequence for the process itself, as changes in the velocity of conversion will bring about changes in e.g. the heat development which call for intervention to keep the process under control. Thus, with a certain content of polymer the monomer will very often show a gelatinating effect which causes a violent increase of the polymerisation velocity. This is the case e.g. with methyl metacrylate, and as it causes an increased development of heat, it is important to know in time when the critical content of polymer has been reached, in order that the cooling of the reaction mixture can be intensified to prevent increases of pressure and temperature.

It is also important for the properties of the resulting product to be able to control the conversion rate, as it will often be necessary during the polymerisation to intervene at certain contents of the polymer, in order to obtain the desired properties.

As an example of such intervention could be mentioned the addition of substances which influence the polymer structure during the polymerisation of styrene-butadiene-mixtures to form synthetic rubber.

In copolymerisations, the monomers will often react with different velocity, and to obtain a homogeneous copolymerisate of the desired composition, the addition of the quicker reacting monomer should keep time with the consumption.

Furthermore, many technical polymerisations are not carried to an end, but stopped at specific degrees of conversion, at which the resulting polymer has the best qualities. As examples can be mentioned the production by emulsion polymerisation of styrene-butadiene-rubber, in which the process is stopped at 72% conversion to avoid the cross-linking which occurs in later stages of the process.

In the suspension polymerisation of monovinyl compounds the polymer formed towards the end of the polymerisation will have a lower molecular weight than desirable. This is particularly of consequence in the case of halogenated vinyl compounds, where the low-molecular compounds have reduced light and heat resistance. Also in this case it is accordingly valuable to be able to follow the degree of conversion in order that the process can be stopped at the right moment.

There are several methods of determining the degree of conversion during the process.

According to the method most commonly employed, samples are taken of the reaction mixture, and the mixture of polymer and monomer is isolated by filtering, if desired after adding a coagulating agent to the emulsion. After washing, the polymer-monomer mixture is dissolved, and it is then possible to determine the quantity either of the polymer by precipitation and weighing, or of the monomer by titrating remaining reactive groups, e.g. vinyl groups.

According to other methods, the plasticity of the isolated and purified sample is measured, and in certain cases it is sufficient to determine the contents of dry matter in a given quantity of the reaction mixture after evaporation of water and unreacted monomer.

Obviously, none of the said methods are particularly quickly carried out or especially suited for an automatized process.

It has now been found that the progress of a polymerisation process in heterogeneous phase can be quickly and easily controlled and, if desired, regulated according to the invention, by adding a volatile substance, to the reaction mixture, before the start or during the progress of the polymerisation, said volatile substance being practically insoluble in the continuous phase, but easily soluble in the monomer or mixture of monomers to be polymerized, and only slightly soluble in the polymerisate. This makes it possible to follow the course of the polymerisation process in a very simple manner by means of a straightforward measuring of the pressure in the polymerisation vessel, which is kept at a constant temperature during the polymerisation.

The method is based on the fact that the partial pressure of the volatile substance (the pressure indicator) changes gradually, as the quantity of monomer changes. At the beginning of the process, when large quantities of monomer are present, the pressure will be comparatively low, but during the transforming of the monomer into polymer, the mole-fraction of the pressure indicator in the monomer increases, and this results in an increase of the pressure in the reaction vessel.

Figure 2:
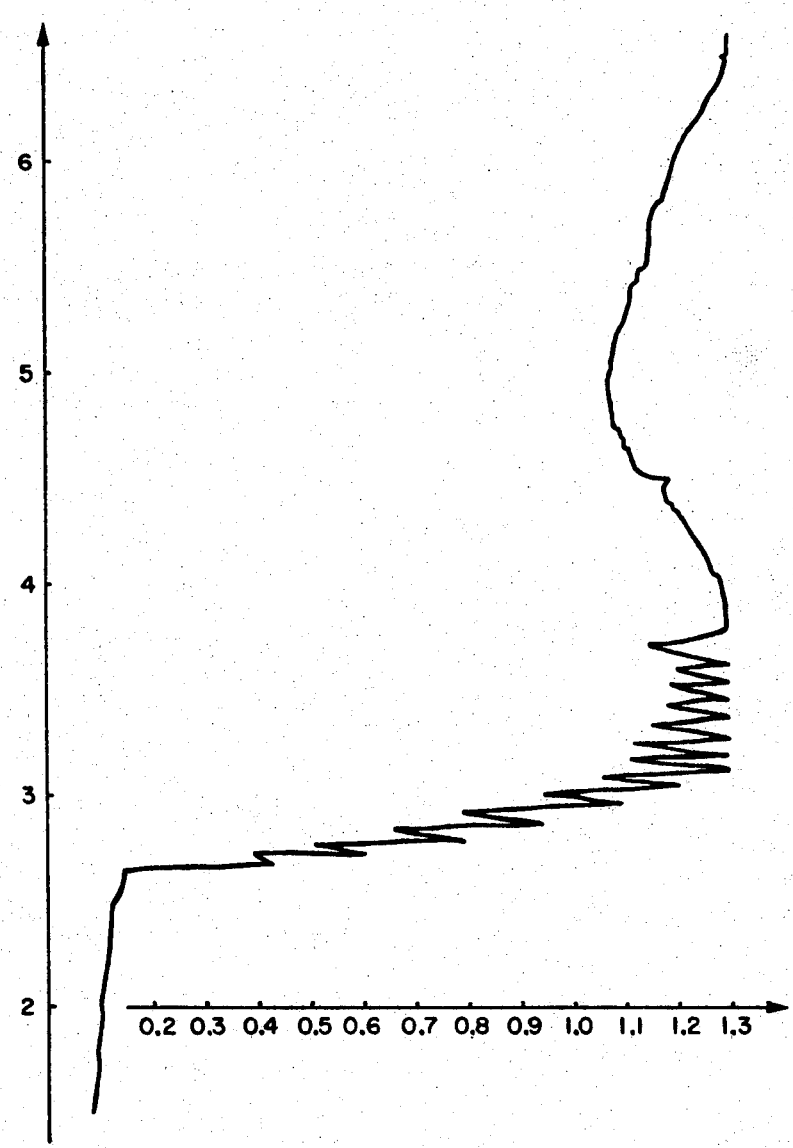
Figure 3:
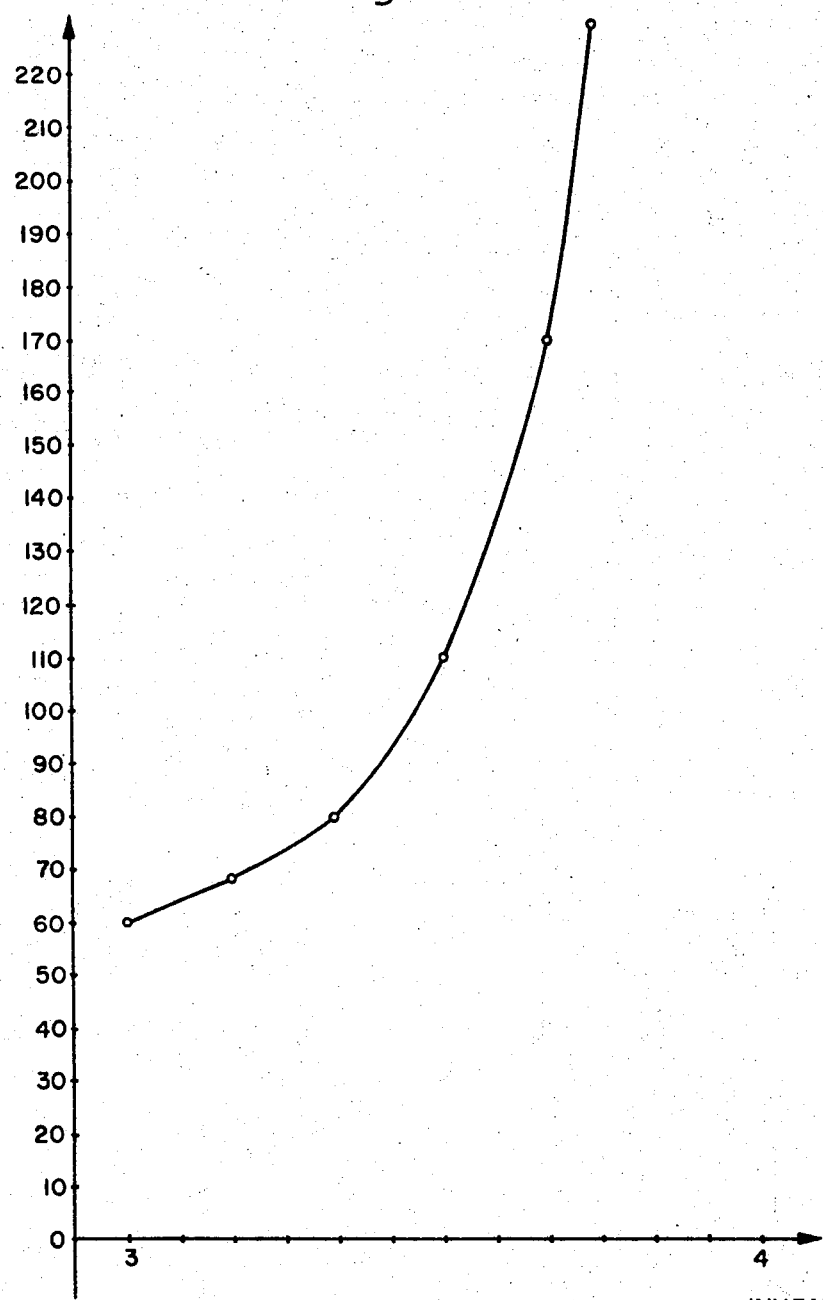

A graphic illustration of the variation in pressure can be given in various ways as appears from the accompanying drawings, in which FIG. 1 graphically illustrates the pressure progress and the corresponding degree of transformation in relation to the polymerisation time when adding the pressure indicator before the polymerisation, FIG. 2 is a graph of the pressure progress in relation to time by intermittent addition of the pressure indicator during the polymerisation process, and FIG. 3 is a graph of the pressure decrease period in seconds by intermittent addition of pressure indicator in relation to the progress of the polymerisation process.

The shape of the curve in FIG. 1 and the absolute values of the pressure will depend on the actual conditions, but in any case a curve will be obtained that tells something about the rate of transformation and that can be adjusted for polymerisation under identical conditions to show a direct relation between the pressure in the reaction vessel and the rate of transformation at a given moment.

Besides, among other things the slope of the curve tells something about the reaction velocity at a given moment, whether there is an induction period, and whether the system shows a gelatinating effect.

Finally, the curve also shows when the process has been finished, as the pressure will then become constant. However, it has been noticed that in many cases the cessation of the polymerisation is inaugurated by a fall of pressure, and it is not until some time after this that the pressure becomes constant. This is supposed to be due to the fact that the temperature within the polymer grains themselves will be somewhat higher than in the surrounding medium, as long as a reaction is taking place, even by careful control of the reaction temperature, and only when the reaction ceases does the temperature fall to the predetermined value.

In copolymerisation procedures, various tricks have been used to obtain a homogeneous polymer. Thus, it is known, for example, to add both monomers at the rate in which they react. In the present method it will be very easy to control the amount of unreacted monomer in the reaction vessel by simply adding a small quantity of pressure indicator at the beginning of the process. As the monomer is consumed, the pressure will increased. If more monomer is added, the pressure will fall. In this way it is possible constantly to keep a small surplus of unreacted monomer by regulating the rate of addition, so that the pressure remains constant. The addition may be carried out automatically.

In a few cases it is found desirable not to add the pressure indicator at the beginning of the process in order to avoid a possible influence on the progress of the polymerisation, or to be able to use a minimum of the volatile substance only, so as to avoid too high a pressure towards the end of the process. For this purpose another embodiment of the present method has been developed, which in addition to the above mentioned advantages is very sensitive to small changes in the ratio between polymer and monomer.

This embodiment of the present method is based upon measuring of the speed at which the pressure indicator diffuses into the particles of the heterogeneous phase consisting of a mixture of monomers and polymers and is especially suitable for suspension polymerisation.

The process is started as usual, and only when approaching the critical stage of transformation, in which it is difficult to control the process, addition of the pressure indicator begins. The progress of the reaction is illustrated by the curve shown in FIG. 2, where the first adding is taken place 2¾ hours after the start. The substance is added intermittently in portions of equal size and with a fixed time interval between the added portions. During the addition, the pressure quickly increases to a value corresponding to free drops of pressure indicator being present in the suspension, but then the pressure begins to fall again indicating that the pressure indicator is beginning to diffuse into the particles consisting of a mixture of polymer and monomer, dissolving in the latter. The rate of this dissolution process, involving a diffusion through the continuous phase, depends i.e. upon the surface area of the discontinuous phase, i.e. the grain size, and upon the possible presence of a protective colloid, upon the already added quantity of pressure indicator, upon the temperature, and upon the absolute pressure, but it turns out that for the same process the rate of dissolution at a given degree of transformation is indeed very constant from time to time. The pressure fall after an addition, therefore, can be used as a direct measure for the degree of transformation.

The easiest way of measuring consists in adding the pressure indicator in portions of equal size, as described above, until a pressure chosen beforehand has been reached, and then measuring the time that passes while the pressure falls from this first reference value $P_1$ to another lower reference value $P_2$. The next time is added only just sufficient volatile substance to bring the pressure to the value of $P_1$, and again the time between $P_1$ and $P_2$ is measured. It will be seen that at the beginning the time needed for the pressure fall increases very slowly, but then at a certain degree of transformation begins to increase very quickly, cf. FIG. 3, illustrating the conditions in a suspension polymerisation for production of polystyrene. By varying $P_1$ and $P_2$ and the time space between two additions it is possible to make the sudden increase take place at different degrees of transformation.

The method is very sensitive to small variations in the content of polymer in the suspended particles and is, therefore, well suited for determination of the time of adding substances that have to be added when a certain content of polymer is reached.

Besides determining the time needed for a certain pressure fall, it is also possible to measure the pressure fall during a given time or to measure the maximum pressure for a given addition of the indicator. Further, it is possible to add the indicator continuously, and to measure how quickly it can be added at a given pressure. However, the method described above seems to be the most advantageous.

Besides, there are transitional forms of the methods outlined hereinbefore. It is possible, for example, to delay the adding of the pressure indicator until the process has been going on for some time and only then begin to follow the increase of pressure during the rest of the reaction. A combination of the methods can also be used, in which the diffusion method is used for determining a period of time after which the adding is to be stopped. The pressure will then fall to an equilibrium pressure, but during the continued conversion it increases again until a maximum pressure has been reached, corresponding to the reaction being finished.

The above embodiments are excellently suited to form a basis for an automation of the polymerisation process.

In the first embodiment, in which the pressure indicator has been added at the start, a standard contact manometer may be used giving a signal at the desired pressure, i.e. at the desired degree of conversion. The signal may activate an alarm clock in known manner, or it may call forth a direct intervention in the process.

The rate of conversion can also be measured in a simple way and the measuring be used for controlling the process.

The measuring can be carried out, for example, by means of a differential manometer and two boxes, which are placed in a thermostat and connected to the reaction vessel by means of magnet valves. At the beginning of the measuring, one box is opened, and the pressure adjusts itself at a pressure $P_a$. The box is then closed, and at a later time the other box is opened, resulting in the pressure $P_b$. The pressure difference, $P_a-P_b$, is an expression for the transformation rate and can be read from the differential manometer, which can give a direct impulse at a given difference to keep the reaction rate below a fixed value, e.g. by supplying cooling water to a cooling jacket of the reaction vessel.

As pressure indicators can be used for example hydrocarbons, such as propane, butane, pentane, hexane, and cyclohexane, and mixtures thereof, such as petrol ether and ligroins. Moreover, halogenated hydrocarbons can be used, preferably the ones having one or two carbon atoms in the molecule, and in which all or nearly all hydrogen atoms have been replaced by chlorine, fluorine or both. Also substances such as methylene chloride, bromochloromethane and diethyl ether can be used.

Of monomers, which can be polymerised in heterogeneous phase, can be mentioned methyl acrylate, methyl methacrylate and other methacrylates, acrylonitrile, vinyl chloride, vinylidene chloride, vinyl acetate and other vinyl esters with organic acids, N-vinylcarbazol, vinyltoluene, methylvinylketone, butadiene, styrene and compounds of styrene and butadiene, isoprene, chloroprene, and isobutylene.

In the following, the present method will be illustrated by some examples.

Example 1

19 litres of distilled water are poured into a 35 l. stainless polymerisation vessel provided with a stirrer and the necessary pipe connections, and the stirrer is started. To the water are added 70 grams highly hydrolysed polyvinyl alcohol, which are moistened with 200 ccs. of methanol to facilitate the dispension of the polyvinyl alcohol in the water, and to secure a quick and complete dissolution. The water is heated to 81° centigrade, and the polymerisation vessel is closed. Methanol and dissolved air are removed by establishing a vacuum in the vessel until the water has been boiling for 10 minutes. Then the vacuum is turned off, and the following mixture is added:

|  | Grams |
|---|---|
| Styrene monomer | 5480 |
| Polystyrene | 1760 |
| Divinylbenzene | 300 |
| Petrol ether | 350 |
| Ethylvinylbenzene | 250 |
| Benzoyl peroxide | 60 |

The temperature in the vessel falls to about 69° centigrade during the addition, but again increases to 81° centigrade during 15 minutes and is kept at this value during the rest of the process.

The monomer will be dispersed in the water phase as balls of the order of magnitude of 0.5 mm. diameter. The ball size grows during the process, slowly at the beginning, but at a polymer content of about 70%, the dispersing agent will no longer be able to keep the balls separate, and the whole monomer phase may clot to a tough mass in a few minutes, so that it is necessary to add a stronger stabilizing agent before this happens. If the latter is added too early, however, too small balls will be obtained, and it is necessary, therefore, to follow the progress of the polymerisation very carefully. This is done by measuring the pressure in the reaction vessel, and a graph is drawn, showing the variation in pressure in relation to the expired time. After 2 hours and 50 minutes, the pressure has increased to 0.67 ato. From earlier experiments it is known that the monomer now contains 65 to 66% of polymer. Therefore, 400 ccs. of a 6% aqueous solution of a medium hydrolysed polyvinyl alcohol are added. The ball size will now be 1.5–2.0 mm. and will not substantially change during the rest of the process. After 6 hours, the pressure will become constant, which means that the polymerisation has been completed.

The suspension is then cooled, and the balls are filtered off and washed. A total of 7.85 kg. beautiful round balls of 0.5–2 mm. diameter is obtained. By swelling and subsequent sulphonation with sulphuric acid in the normal way, the balls can be worked up for use as a cation exchanger.

Example 2

A solution is made consisting of 175 kilograms of polystyrene scrap dissolved in 925 kilograms of styrene. The mixture has a viscosity of 320 centipoises. To the mixture are added 7.5 kilograms of benzoyl peroxide. 2625 litres of water, in which 7.5 kilograms of a low-viscous, strongly hydrolysed polyvinyl alcohol have been dissolved, are poured into a 4 m.³ polymerisation vessel provided a.o. with an effective stirrer, a jacket for heating and cooling, supply inlets, and a liquid indicator. The stirrer is started, and the water is heated to 78° centigrade.

Then the polymer solution is pumped into the polymerisation vessel under continuous stirring. The pumping takes 9 minutes, and the temperature in the vessel falls to about 69° centigrade. The resulting suspension is heated to 80° centigrade, and kept at this temperature. After 2 hours, measuring of the degree of transformation is started. The measuring is done as follows. A commercial pentane fraction (petrol ether) is added to the reaction mixture in portions of about 2 litres, until the pressure has reached 1.3 ato. In the present case 11.5 litres will be needed. At this point the addition is stopped, until the pressure has fallen to 1.20 ato. The time used for the pressure to fall is a function of the speed at which the petrol ether is absorbed by the balls and will—other things being equal—be a measure of the degree of transformation.

5 minutes after the latter addition, patrol ether is again added until the pressure has reached 1.30 ato.

To obtain this increase in pressure, 2.0 litres of petrol ether are used, and again it is noted how long it takes for the pressure to fall to 1.2 ato. This is further repeated five times, the pressure fall period being noted. After the fifth addition, said period has increased to 170 seconds, corresponding to a polymer content of 68%. Now the right viscosity for adding the main quantity of petrol ether will have been reached, and the addition takes place continuously, a total of further 107 litres being added at a rate of 2.1 litres per minute. To get the bulk of petrol ether absorbed while the grains are still swollen with monomer, the suspension is simultaneously cooled to 65° centigrade to reduce the rate of speed of the polymerisation. The cooling takes 25 minutes.

The reaction mixture is again heated to 80° centigrade, and the suspension is kept at this temperature for another 9 hours, after which it is cooled to 45° centigrade, and the grains are separated from the water by centrifuging. The resulting product consists of ball-shaped grains having a diameter of about 2 mm., which balls may be made to expand by a treatment with steam.

Example 3

Stabilized vinylidene chloride is distilled at reduced pressure, the distillate being received in a vessel which has been cooled down to −65° centigrade.

Common propane gas is freed from sulphur compounds by a treatment with mercury chloride, and then led into 35.00 grams of vinylidene chloride, until 1.92 grams have been dissolved.

Into a 250 ccs. autoclave provided with a magnetic stirrer, a manometer, and a venting valve, 100 ccs. are placed of a solution containing 0.30 gram of ammonium persulphate
0.30 gram of sodium bisulphate
1.00 gram of sodium bicarbonate
1.00 gram of sodium laurylsulphonate.

The autoclave with contents is cooled to about −60° centigrade and blown through with nitrogen, after which the vinylidene chloride with dissolved propane is added, and the system is closed. It is then heated to 25° centigrade, and stirring is started as soon as the water phase has become liquid.

The autoclave is kept at 25° centigrade, and the pressure is read at even intervals. At the beginning, the pressure increases slowly, but after 4 hours the increase will be stronger, about 0.35 atmosphere per hour. After 7 hours, the pressure will be 4.0 ato., corresponding to about 70% transformation of the monomer vinylidene chloride, and the reaction is then stopped by cooling.

The rather thick dispersion is poured into 150 ccs. of water, which has been saturated with sodium chloride, and is filtered, and washed, first with a sodium carbonate solution, and then with water and methanol. The polymer is dried in vacuum at 60° centigrade, and after addition of a little tricresyl phosphate, it can be pressed into slabs at 190° centigrade without yellowing.

In order to automatize the present process, for instance, the process of Example 2, a control system can be established as follows.

The system consists of a chronometer, an impulse transmitter, a contact manometer, a delaying relay, and a pump, and it functions in the following way.

130 minutes after the start of the process, the chronometer activates the impulse transmitter, controlling the function of the pump. Every 3 minutes, the impulse transmitter starts the pump running for a 45-second period after which it is stopped. During said 45 seconds petrol ether is pumped into the polymerisation vessel, until the pressure has increased to 1.3 ato. at which point the contact manometer will stop the pump, blocking the starting impulses from the still active transmitter. At the same time, the manometer starts the delaying relay. The latter is adjusted to run for a period of 130 seconds. If the pressure has dropped to 1.2 ato. before this period has expired, the connection between the impulse transmitter and the pump is reestablished, and petrol ether is pumped in until the delaying relay is again activated.

If the pressure has not fallen to 1.2 ato. during the said 130 seconds, this means that the desired degree of polymerisation has been reached, and the delaying relay, therefore, will start addition of the bulk of petrol ether, and cooling of the polymerisation vessel.

We claim:

1. In a liquid heterogeneous phase polymerization process for ethylenically unsaturated monomer in a closed vessel, the method of controlling the progress of the polymerization of ethylenically unsaturated monomers which comprises: adding to the reaction medium a volatile substance selected from the group consisting of hydrocarbons, mixtures of hydrocarbons, and halogenated hydrocarbons boiling below 100° centigrade which is substantially insoluble in the continuous phase of the reaction mixture, soluble in the dispersed monomer, and slightly soluble in the resulting polymer; during the polymerization conversion of monomer to polymer measuring the pressure changes within the closed reaction vessel due to the changes in the partial pressure of the volatile substance in relation to the quantity of monomer to polymer; and, controlling the polymerization reaction by adjusting the polymerization conditions in response to the measured partial pressure of said volatile substance.

2. The method of claim 1, in which at least part of the volatile substance is added before the polymerisation is started.

3. The method of claim 1, in which a mixture of monomers is polymerised in aqueous dispersion.

4. The method of claim 1, in which adding of the volatile substance is not started until the polymerisation process approaches a critical degree of transformation, during which it is difficult to control the process, and that the addition takes place intermittently in dependance of the pressure in the reaction vessel.

5. The method of claim 1, in which the ethylenically unsaturated monomer is selected from the group consisting of monomers of methyl acrylate, methyl methacrylate, acrylonitrile, vinyl chloride, vinylidene chloride, vinyl acetate, N-vinylcarbazol, vinyltoluene, methylvinylketone, butadiene, styrene, isoprene, chloroprene, and isobutylene, and mixtures thereof.

6. The method of claim 1, in which the volatile substance is petrol ether.

7. The method of claim 1 wherein the volatile substance is added to the reaction medium intermittently in portions of equal size after the polymerization has started.

8. The method of claim 1 wherein the volatile substance is added to the reaction medium intermittently in portions of equal size after the polymerization has started and with a fixed time interval between the added portions.

9. In a liquid heterogeneous phase polymerization process for ethylenically unsaturated monomer in a closed vessel, the method of controlling the progress of the polymerization reaction of the ethylenically unsaturated monomer selected from the group consisting of monomers of methyl acrylate, methyl methacrylate, acrylonitrile, vinyl chloride, vinylidene chloride, vinyl acetate, N-vinylcarbazol vinyltoluene methylvinylketone butadiene styrene, isoprene, chloroprene, and isobutylene, and mixtures thereof, comprising: adding to the reaction medium a volatile substance selected from the group consisting of hydrocarbons, mixtures of hydrocarbons, and halogenated hydrocarbons boiling below 100° centigrade which is substantially insoluble in the continuous phase of the reaction mixture, soluble in the dispersed monomer, and slightly soluble in the resulting polymer; during polymerization conversion of the monomer to polymer measuring the pressure changes within the closed reaction vessel due to the changes in the partial pressure of the volatile substance resulting from the changes in the quantity of monomer present in the reaction medium, thus indicating the degree of transformation of monomer to polymer; and, controlling the polymerization reaction by adjusting the polymerization conditions in response to the measured partial pressure of said volatile substance.

10. The method of claim 9 wherein the volatile substance is added to the reaction medium intermittently in portions of equal size after the polymerization has started and with a fixed time interval between the added portions.

References Cited

UNITED STATES PATENTS 2,875,186  2/1959  Gerhard et al. _____ 260—92.8

JOSEPH L. SCHOFER, *Primary Examiner.*

WILLIAM HAMROCK, *Assistant Examiner.*

U.S. Cl. X.R.

260—29.6, 80.3, 82.1, 83.5, 83.7, 85.3, 85.5, 85.7, 86.1, 87.5, 87.7, 88.1, 88.3, 88.7, 89.5, 92.1, 92.3, 92.8, 93.5, 94.2, 94.8, 94.9, 95